United States Patent

[11] 3,607,227

| [72] | Inventors | Stephen David Stephenson;<br>John Holt, both of Sheffield, England |
|------|-----------|---------------------------------------------------------|
| [21] | Appl. No. | 791,792 |
| [22] | Filed | Jan. 16, 1969 |
| [45] | Patented | Sept. 21, 1971 |
| [73] | Assignee | National Research Development Corporation |
| [32] | Priority | Feb. 2, 1968 |
| [33] | | Great Britain |
| [31] | | 5408/68 |

[54] PRODUCTION OF SPHEROIDAL GRAPHITE IRONS
17 Claims, No Drawings

[52] U.S. Cl.................................................. 75/48,
75/51, 75/58, 75/130, 75/133,
[51] Int. Cl....................................................... C21c 1/04,
C21c/1/10 C21c 7/00
[50] Field of Search............................................. 75/53, 58,
129, 130, 133

[56] References Cited
UNITED STATES PATENTS

| 1,809,436 | 6/1931 | Carman.......................... | 75/51 |
| 1,992,999 | 3/1935 | Frey.............................. | 75/51 |
| 2,762,701 | 9/1956 | Crego........................... | 75/48 |
| 2,988,445 | 6/1961 | Hurum.......................... | 75/58 |
| 3,058,822 | 10/1962 | Volianik........................ | 75/48 |
| 3,076,705 | 2/1963 | Yearley......................... | 75/130 |
| 3,223,521 | 12/1965 | Stone............................ | 75/53 X |
| 3,304,174 | 2/1967 | Ototani......................... | 75/53 X |
| 3,332,772 | 7/1967 | Kanter.......................... | 75/53 X |
| 3,360,364 | 12/1967 | Ivey.............................. | 75/53 X |
| 2,974,035 | 3/1961 | Ototani......................... | 75/129 X |

*Primary Examiner*—L. Dewayne Rutledge
*Assistant Examiner*—Joseph E. Legru
*Attorney*—Finnegan, Henderson & Farabow ABSTRACT: A method of producing spheroidal graphite irons from starting materials consisting predominantly or entirely or unselected ferrous scrap is provided. In the method, a ferrous bath is subjected to oxidation to remove or reduce to very low levels any elements inimical to spheroidization. The oxidation also reduces the carbon content of the bath to a relatively low level. Therefore, the method also includes the step of injecting powdered graphite by a carrier gas into the metal to restore the required carbon content of the iron. This method eliminates the necessity for selecting special starting materials and allows unselected ferrous scrap to predominantly or entirely comprise the ferrous charge.

PRODUCTION OF SPHEROIDAL GRAPHITE IRONS

This invention relates to the production of spheroidal graphite ("S.G.") irons.

The conventional production process, as carried out in acid or basic cupolas or in electric furnaces starts essentially with a dead melting operation on a charge composed of selected cast iron, or refined pig iron, singly or together, with or without selected steel scrap, to which graphite and ferrosilicon are added, the proportions used being dependent upon the melting unit employed and the grade of S.G. iron required, a spheroidizing addition then being made (usually after tapping into a ladle), the common addition being magnesium. Cerium is another known addition. Because dead melting is used, it is necessary to select any steel and cast iron scrap carefully, so as to keep to as low a level as possible many elements commonly found in scrap, that are inimical to the mechanism of formation of graphite in spheroidal form. In particular, these are manganese, titanium, molybdenum, tungsten, vanadium, boron, antimony, lead, tin, bismuth, and zinc, the levels of these being relatively unaffected in dead melting. Sulfur and phosphorus also have an adverse effect on the spheroidization process but the levels of these elements may be reduced by suitable treatments. The degree of selectivity that can be applied in the use of scrap is governed by economic considerations, and accordingly many S.G. irons are produced that contain the undesirable elements to some degree and therefore have mechanical properties inferior to what the use of pure materials would give. Indeed, although specifications in use for S.G. irons accept such inferiority of properties, it is still sometimes necessary to use heat treatment on the "as-cast" material to generate the microstructures required to give the properties.

One object of the invention is to enable spheroidal graphite iron to be produced from a charge of ferrous material that does not have to be specially selected for the avoidance of undue amounts of elements that are inimical to spheroidization, or to be subjected to any preliminary refining for the reduction of such elements to a permissible level. A particular aspect of this object is to enable a charge to be used that consists predominantly or even wholly of unselected ferrous scrap, e.g., steel scrap and cast iron scrap, with elimination or control of the amounts of such inimical elements.

A further object of the invention is to produce from such starting materials spheroidal graphite irons having very good mechanical properties in the as-cast condition, and capable of being given still better properties by subsequent heat treatment. According to the present invention, a process for the production of spheroidal graphite iron comprises subjecting a ferrous melt to an oxidation boil for a period sufficient to reduce to very low levels any elements that are inimical to spheroidization, deoxidizing the molten metal, injecting powered graphite by a carrier gas into the metal under reducing conditions, which conditions also reduce to a very low level any sulfur present, and adding a spheroidization addition.

In contrast to the existing processes of producing spheroidal graphite irons, involving as starting materials, singly or together, steel scrap and cast iron scrap that have been specially selected, or pig iron that has been refined, the process according to the invention is not only highly economical by enabling to be used starting materials previously believed to be unsuitable, but also permits unselected steel scrap to form a predominant part of the melt, or even the whole of the melt. Because the temperature at meltout of a charge predominantly or wholly of steel is considerably higher than that of a dead-melted charge predominantly of iron, there is already at this stage some reduction in the amounts of volatilizable elements present in the charge, e.g., antimony, tin, lead, bismuth, and zinc, and the amounts then remaining of such elements are still further reduced during the subsequent oxidation stage of the process of the invention, when other inimical elements are also reduced to very low levels, even if the charge is of 100 percent steel scrap.

What has just been stated applies in similar fashion when unselected cast iron and/or pig iron is used in the charge. Furthermore, the process of the invention can be effectively applied to unrefined pig iron, preferably for economical considerations—in the molten condition directly from the blast furnace when the oxidation boil, followed by the deoxidation, bring the melt into condition to receive in turn the gas-injected powered graphite and the spheroidization addition.

The oxidation may be carried out by any of the usual techniques; ore boiling, oxygen lancing, or the use of an oxy-fuel burner (oil or gas).

The deoxidization may be performed by introducing one or more of the usual additions, such as ferrosilicon and aluminum.

The carrier gas for the injection of the powdered graphite may be simply air; but argon and nitrogen may also be used.

Any suitable addition may be used as the spheroidization addition, e.g., NiMg, Fe Si Mg, cerium or magnesium.

Following the oxidation, the bath needs to be sampled for manganese and carbon, when, if the manganese is at an acceptable level, usually of the order of 0.1 percent or of the order of 0.2 percent for ferritic grades of S.G. iron, the deoxidizing stage is carried out.

For the production of "alloy" S.G. iron containing nickel, e.g., up to 32 percent sampling for nickel (present by way of the charged scrap) should also be done at this stage, followed by any required addition of nickel to make up the amount required in the product. Similarly, sampling should be done at this stage for other constituents of "alloy" S.G. iron, e.g., copper and chromium, followed by any required addition.

Although it has been indicated above that any of the usual techniques may be employed for carrying out the oxidation, according to a further feature of the invention, the oxidation is performed by the injection with a carrier gas of a powdered oxide of a metal that is to be a constituent of the final product. This injection of a metal oxide may be carried out with any of the carrier gases described above for use in the injection of the powdered graphite. Oxygen and carbon dioxide may also be used. In general, iron oxide may be used for this purpose, e.g., in the form of millscale, iron ore, or iron oxide dust from fume cleaning plant; but, for example, nickel oxide and/or chromium oxide can be used where the corresponding metals are to be constituents of the "S.G." iron. "Powdered" in this connection embraces granular material capable of being entrained by the carrier gas, continuously or in batches, say up to 0.125-inch (3 mm.) or thereabouts. One advantage of introducing a suitable powdered metal oxide, e.g., of Fe, Ni, or Cr, by injection is that a relatively low temperature boil can be initiated and continued, thereby facilitating the removal of such oxidizable elements as phosphorus, manganese, and chromium. There is also the important general advantage arising from the injection of a metal oxide that the oxidation is free from the various drawbacks attendant on the use of the usual oxidation techniques. Thus, the production of brown iron oxide fume, which is a feature of oxygen lancing, is either avoided or is reduced to an amount that can easily be disposed of by fume cleaning equipment. Again, the injection of the metal oxide can be carried out without the severe wear of the refractories that accompanies the use of oxy-fuel burners.

In a preferred way of carrying out the invention, all the operations except making the spheroidization addition are performed in the furnace, the addition being made after tapping into a ladle. Thus, following oxidation and sampling for manganese and carbon, slag formed on the bath by an addition of limestone or the like and containing the products of oxidation is removed, and the bath is deoxidized by an addition of ferrosilicon, or an addition of aluminum followed by ferrosilicon. A reducing slag is then made up, and the powdered graphite is injected by the carrier gas through a lance until the required carbon content is attained, the injection process also having the effect of creating turbulence to bring about intimate mixing of slag and metal, this aiding desulfurization The metal is then tapped into a ladle, containing the spheroidization addition, such as NiMg, Fe Si Mg. cerium, or magnesium. Alternatively, the spheroidization addition is introduced into the ladle after the metal has been tapped.

The following are two examples of the production of S.G. iron from a charge of 100 percent steel scrap.

EXAMPLE I

Three tons of 100 percent unselected steel scrap were charged into an electric arc furnace. After the charge had been melted out at approximately 1,550° C. the bath was sampled and found to contain, by weight:

C   0.12 percent

Mn  0.20 percent

P   0.006 percent

S   0.025 percent

A slag was then formed on the bath in conventional manner, and the bath then oxidized by oxygen lancing, external heating being discontinued during oxidation. After oxidation, the bath was again sampled and found to contain by weight:

C   trace

Mn  0.05 percent

P   0.004 percent

S   0.021 percent

Following oxidation, the bath was slagged off and deoxidized using a ferro silicon addition.

A reducing slag was then made up in conventional manner, following which graphite powder was injected by a lance into the bath, using compressed air as the carrier gas, the powder being of a size 5 BSS, 363 pounds of graphite powder being injected in 8 minutes. After the powder had been injected, the bath was again sampled and found to contain by weight:

C   3.4 percent

S   0.007 percent showing that 60 percent of the injected carbon had been recovered.

Finally the bath was tapped into a ladle containing the spheroidization addition Fe Si Mg.

In the as-cast condition, the S.G. iron had an ultimate tensile strength of 32 tons/inch$^2$ and an elongation of 16 percent.

EXAMPLE II

The same procedure was followed as with example I on a charge of 4.5 tons of 100 percent unselected steel scrap.

After oxidation of the bath, the bath was sampled and found to contain 0.095 percent by weight carbon.

Following slagging off, deoxidation of the bath and the production of a reducing slag, 428 pounds of powdered graphite of a size −5 BSS was injected into the bath by a lance, again using compressed air as the carrier gas, in 11 minutes. The bath was then sampled and found to contain 3.65 percent carbon, showing that 92 percent of the injected carbon had been recovered.

The bath was then tapped into a ladle containing the spheroidization addition Fe Si Mg.

In the as-cast condition, the S.G. iron had an ultimate tensile strength of 37 tons/inch$^2$ and an elongation of 13 percent. When annealed, the S.G. iron had an ultimate tensile strength of 31 tons/inch$^2$, an elongation of 20 percent and a Charpy impact value of 11 to 12 ft.-lb. When normalized, it had an ultimate tensile strength of 50 tons/inch$^2$ and an elongation of 8 percent.

We claim:

1. A process for the production of spheroidal graphite iron comprising subjecting a ferrous bath to an oxidation boil for a period sufficient to reduce to very low levels any elements that are inimical to spheroidization, deoxidizing the molten metal, injecting powdered graphite by a carrier gas into the metal under reducing conditions, which conditions also reduce to a very low level any sulfur present, and adding a spheroidization addition.

2. A process as in claim 1, wherein the ferrous bath is formed from a charge consisting predominantly of ferrous scrap.

3. A process as in claim 2, wherein the charge consists predominantly of steel scrap.

4. A process as in claim 2, wherein the charge consists of 100 percent steel scrap.

5. A process as in claim 2, wherein the scrap is unselected.

6. A process as in claim 1, wherein the deoxidizing stage is carried out after manganese in the charge has bee reduced to an acceptable level by the oxidation boil.

7. A process as in claim 1, wherein for the production of "alloy" spheroidal graphite iron, the deoxidizing stage is carried out after the charge has been sampled and, if necessary, the required amount of alloying addition made.

8. A process as in claim 1, wherein oxidation is carried out by any of the usual techniques, such as ore boiling, oxygen lancing, or the use of an oxy-fuel burner.

9. A process as in claim 1, wherein oxidation is performed by the injection with a carrier gas of a powdered oxide of a metal that is to be a constituent of the final product.

10. A process as in claim 1 wherein all the operations except making the spheroidization addition are performed in the furnace, and following oxidation and sampling for manganese and carbon, slag formed on the bath by an addition of limestone or the like and containing the products of oxidation is removed, and the bath is deoxidized by an addition of ferrosilicon, or an addition of aluminum followed by ferrosilicon, when a reducing slag is then made up, and the powdered graphite is injected by the carrier gas through a lance until the required carbon content is attained, the injection process also having the effect of creating turbulence to bring about intimate mixing of slag and metal, this aiding desulfurization following which the metal is tapped into a ladle containing the spheroidization addition.

11. A process as in claim 1, wherein the spheroidization addition is Ni Mg.

12. A process as in claim 1, wherein the spheroidization addition is FE Si Mg.

13. A process for the production of spheroidal graphite iron from a ferrous charge containing relatively large or uncontrolled amounts of elements inimical to spheroidization, which comprises the steps of:
removing the inimical elements from a molten bath of the ferrous charge by oxidation, said oxidation reducing the carbon content of the bath to a relatively low or trace amount;
deoxidizing and desulfurizing the bath;
injecting powdered graphite into the bath by a carrier gas to restore the required carbon content of the iron; and
adding a spheroidization addition to the bath.

14. The process of claim 13, wherein the ferrous charge is predominantly composed of scrap material of uncontrolled composition.

15. The process of claim 13, wherein all of the steps except adding the spheroidization addition are performed in a furnace, and which includes:
sampling the bath to determine its manganese and carbon content;
removing slag formed on the bath after the oxidation and sampling by an addition of limestone or the like, said slag containing the products of oxidation;
applying a reducing slag to the bath;
injecting powdered graphite by the carrier gas through a lance until the required carbon content is attained, the injection creating turbulence to bring about intimate mixing of the slag and metal to aid desulfurization; and tapping the metal into a ladle containing the spheroidization addition.

16. The process of claim 15, wherein the bath is deoxidized by adding a ferrosilicon to the bath.

17. The process of claim 15, wherein the bath is deoxidized by adding aluminum followed by ferrosilicon to the bath.